United States Patent Office 3,631,226
Patented Dec. 28, 1971

3,631,226
VINYLIDENE CHLORIDE POLYMER
COMPOSITIONS
William H. Wineland, deceased, late of Midland, Mich., by Elizabeth R. Wineland, executrix, Midland, and Frank V. Goff, Sanford, and Fred Stevenson, Beaverton, Mich., assignors to The Dow Chemical Company, Midland, Mich.
No Drawing. Filed Apr. 13, 1970, Ser. No. 28,127
Int. Cl. C08f 37/18
U.S. Cl. 260—897 C
5 Claims

ABSTRACT OF THE DISCLOSURE

This invention is directed to improved polymeric compositions comprising in intimate blended combination:
(1) from about 91 to 95 percent by weight, based on the total weight of the composition of a normally crystalline vinylidene chloride polymer containing from about 70 to about 95 percent by weight of vinylidene chloride,
(2) from about 5 to 9 percent by weight of an ethylene polymer having a hydroxyl number of from about 150 to 225 as determined by ASTM Test No. D-1638, modified, and a melt index of at least about 5 to about 385 determined at 190° C./2160 g.; wherein these composoitions provide polymeric film materials having unexpectedly enhanced resistance to tear and include compositions having, in addition, significantly enhanced low temperature flexibility.

BACKGROUND OF THE INVENTION

Polymers and copolymers of vinylidene chloride have found wide use particularly in the preparation of polymeric film materials. Such films possess many useful properties such as inertness, ability to be heat sealed, transparency, shrinkability and low water vapor transmission rates which are especially adapted for packaging foodstuffs. It is desirable, however, to enhance the tear strength of such vinylidene chloride polymer films without adversely affecting the adavntageous properties thereof.

Accordingly, it is a principal object of this invention to provide polymeric compositions based on polymers of vinylidene chloride which can be easily extruded into films, tubes and the like by conventional extrusion techniques, which films have significantly enhanced tear strengths while retaining their desirable properties.

It is a further object to provide polymeric film materials, and other shaped articles, having enhanced tear strengths as well as improved low temperature flexibility.

SUMMARY OF THE INVENTION

These, as well as other objects and advantages, are obtained in and by the practice of the present invention wherein an improved vinylidene chloride polymer composition is provided comprising in intimate blended combination:
(1) From about 91 to 95 percent by weight, based on the total weight of the composition of a normally crystalline vinylidene chloride polymer containing from about 70 to about 95 percent by weight of vinylidene chloride interpolymerized with from about 30 to 5 percent by weight of one or more monoethylenically unsaturated monomers copolymerizable with vinylidene chloride, and
(2) from about 5 to 9 percent by weight of an ethylene polymer having a hydroxyl numbered of from about 150 to 225 as determined by ASTM Test No. D-1638 modified, and a melt index of at least about 5 to about 385 determined at 190° C./2160 g.

DESCRIPTION OF THE PREFERRED EMBODIMENTS

The normally crystalline vinylidene chloride polymer that is used in the process of the present invention is preferably one that will produce a heat shrinkable film having at least about 30 percent shrinkage in boiling water, and advantageously one that will produce a film having a shrinkage between about 45 and 55 percent shrinkage in boiling water. Beneficially, the vinylidene chloride polymer should be plasticized to the extent necessary to produce a polymeric material having a melt viscosity of about 30,000 poise at 160° C.

Typical of the vinylidene chloride polymers useful in the present invention are the normally crystalline materials containing from about 70 to 95 percent by weight of vinylidene chloride with the remainder being composed of one or more monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadines and chloropropane. Known ternary compositions also may be employed advantageously. Representative of such polymers are those composed of at least 70 percent by weight of vinylidene chloride with the remainder made up of, for example, acrolein and vinyl chloride, acrylic acid and acrylonoitrile, alkyl acrylates and alkyl methacrylates, acrylonitrile and butadiene, acrylonitrile and itaconic acid, acrylonitrile and vinyl acetate, vinyl propionate or vinyl chloride, allyl esters or ethers and vinyl chloride, butadiene and vinyl acetate, vinyl propionate, or vinyl chloride and vinyl ethers and vinyl chloride. Quarternary polymers of similar monomeric compositions will also be known. Blends of such polymers may also be advantageously used.

The ethylene polymers which provide unexpectedly enhanced tear resistance to shaped articles, e.g. oriented films, prepared from the compositions of the present invention are characterized by having a specified range of melt index and hydroxy functionality on a hydrocarbon backbone, and can be prepared by hydrolysis of an ethylene polymer such as a copolymer of ethylene and vinyl acetate. Such materials are generically identified by the following physical properties:

Hydroxyl number (ASTM D-1638,
  modified) _____ 150 to 225.
Melt index, (190° C./2160 g.) _____ 5 to 385.
Density, g./cc. at 23° C.                From about
  (ASTM D-1505) _____   0.97 to 0.98.
Melting point, ° C. _____ Up to about
                                         105.

The specified ethylene polymers must be present in amounts of at least about 5 percent by weight, based on the weight of the normally crystalline vinylidene chloride polymer, to provide polymeric film materials having the unexpectedly enhanced increase in tear strength; whereas amounts of such resins in excess of about 9 percent by weight produces irregular, non-uniform film materials having significant internal haze. It has further been found, that concentrations of such ethylene polymers of greater than 6 percent by weight, significantly enhances the low temperature flexibility of the defined polymeric film materials. Thus, such polymers are preferably utilized in amounts ranging from greater than 6 to 9 percent by weight wherein optimum enhancement of tear strength and low temperature flexibility of the polymeric film samples is desired without adverse effect on film clarity or uniformity. When preparing the polymeric compositions of this invention, it is important that a thorough and complete intimate mixing of the polymeric ingredients is effected. This is best accomplished by blending the polymeric materials while they are in a solid powdered or pulverant form. Any means suited for the purpose may be employed, however, such as mixing the polymers in molten form. This is usually less desirable, though, because of the possibility of thermal degradation of the polymers when maintained at melting temperatures for extended periods.

Films and related shaped articles can be fabricated from the compositions of the invention by any of the conventionally employed fabricating or extruding techniques. Of particular advantage is to employ the bubble technique for making films in tubular form. In this regard, it has been found that the addition of the herein described modifying ethylene polymers significantly enhance extrusion efficiency and reduces the necessity for cleaning of the extrusion dies; and further significantly reduces time consuming shut-downs resulting from frequent breaking of the film bubble.

Films prepared from the present compositions can be used in either oriented or unoriented condition. Thus, unoriented films are especially well suited for preparing laminate structures. The unoriented films provide excellent extensibility to the laminate structure as well as providing desirable permeability.

The effect of the addition of the required types and amounts of the prescribed polymeric modifiers upon tear strength, clarity and low temperature flexibility of vinylidene chloride polymer films will be illustrated by the following specific example wherein all percentages and parts are by weight.

Example

A crystalline copolymer composed of about 73 percent by weight vinylidene chloride and about 27 percent by weight of vinyl chloride was prepared by emulsion polymerization, utilizing potassium persulfate as the catalyst and the dihexyl ester of the sodium salt of sulfosuccinic acid as the emulsifier in a manner well known in the art. The so-formed dried crystalline polymer was dry blended with 0.25 percent by weight stearamide and about 9 percent by weight of the plasticizer dibutyl sebacate.

Separate portions of the crystalline polymer were then individually blended with varying amounts of one of a series of modifying ethylene polymers as hereinafter specified.

Samples of the polymer blends were then individually thermally extruded using standard bubble techniques into oriented film having a thickness of about 0.002 of an inch, and the tear resistance of each film (in transverse direction) determined using an Elmendorf Tear Test under an 800 gram load calculated as the stress in grams per mil thickness of the film sample.

Each film sample was additionally evaluated for low temperature flexibility wherein the oriented film, in the form of tubing or bag stock, was first closed at one end while being subjected to an essentially constant temperature of about 4° C., then such tubing was inflated approximately one-half full of cold air and the remaining end sealed. The tube was then rapidly squeezed upon itself 20 times after which the tube was warmed to a temperature of about 25° C., reinflated with air and immersed under water and the number of pin holes present in such tube counted. Film clarity was rated visually.

The following Table I sets forth the characterizing properties of each of the ethylene polymers evaluated.

TABLE I

|  | The invention | | For comparison | | |
| --- | --- | --- | --- | --- | --- |
| Ethylene polymer designation | 1 | 2 | 3 | 4 | 5 |
| Hydroxyl number (ASTM Test D-1630, modified) | 200 | 160 | 310 | 200 | 0 |
| Melt index (190° C./2,160 g.) | 300 | 40 | 30 | 650 | 2 |
| Density, g./cc. at 23° C. | 0.98 | 0.97 | 0.98 | | 0.921 |
| Melting point, ° C. | 104±2 | 70–75 | 109±2 | | 111 |

The following Table II sets forth the properties of each of the film materials prepared:

TABLE II

| Sample No. | Polymeric modifier | | Low temp. fractures (percent of control) | Transverse tear resistance [1] | Film clarity |
| --- | --- | --- | --- | --- | --- |
| | Type | Percent by wt. | | | |
| For comparison: | | | | | |
| 1 | None | | 100 | 27–40 | Clear. |
| 2 | Hydroxy vinyl resin (3) | 7.0 | 200 | 129 | Very hazy. |
| 3 | Hydroxy vinyl resin (4) | 7.0 | 50 | 336 | Very hazy—irregular extrudate. |
| 4 | Polyethylene (5) | 6.0 | 5 | 39 | Hazy. |
| 5 | Hydroxy vinyl resin (1) | 0.5 | 100–150 | 28 | Clear. |
| 6 | do | 1.0 | 100–150 | 41 | Do. |
| 7 | do | 3.0 | 100–150 | 41 | Do. |
| This invention: | | | | | |
| 8 | Hydroxy vinyl resin (1) | 5.0 | 100–150 | 245 | Clear. |
| 9 | do | 6.0 | 100–150 | 215 | Do. |
| 10 | do | 7.0 | 45–55 | 219 | Slight haze. |
| 11 | do | 9.0 | 75 | 234 | Do. |
| 12 | Hydroxy vinyl resin (2) | 7.0 | 7 | 76 | Do. |

[1] G./mil of film thickness at 25° C.

The above data (Sample Nos. 8 through 12) illustrate the unexpected tear resistance obtained in film materials containing from 5 to 9 percent by weight of an ethylene polymer as contemplated by the present invention; the desirable combination of enhanced tear resistance and low temperature crack resistance obtained in film materials containing from greater than 6 to 9 percent by weight of such ethylene polymers, and the uniqueness of such polymer in producing the combination of such desirable properties as compared to structurally similar resins (Samples Nos. 2 and 3) and a related polymeric material (Sample No. 4).

What is claimed is:

1. A polymeric composition comprised essentially of a blend of:
   (1) from about 91 to 95 percent by weight, based on the total weight of the composition of a normally crystalline vinylidene chloride polymer containing from about 70 to about 95 percent by weight of vinylidene chloride interpolymerized with from about about 30 to about 5 percent by weight of at least one monoethylenically unsaturated monomer copolymerizable with vinylidene chloride,
   (2) from about 5 to 9 percent by weight of the composition of an ethylene polymer having a hydroxyl number of from about 150 to 225 as determined by ASTM Test No. D-1638 modified, and a melt index of from about 5 to 385 determined as 190° C./2160 grams.

2. The composition of claim 1 wherein said normally crystalline vinylidene chloride polymer is a copolymer of vinylidene chloride and vinyl chloride.

3. The composition of claim 2 wherein said normally crystalline vinylidene chloride polymer is a copolymer of about 73 percent by weight of vinylidene chloride and about 27 percent by weight of vinyl chloride.

4. The composition of claim 3 wherein said ethylene polymer has a hydroxyl number of about 200 and a melt index of about 300.

5. The composition of claim 3 wherein said ethylene polymer has a hydroxyl number of about 160 and a melt index of about 40.

References Cited

UNITED STATES PATENTS

| | | | |
|---|---|---|---|
| 3,322,862 | 5/1967 | Havens et al. | 260—897 |
| 2,934,514 | 4/1960 | Salyer et al. | 260—45.5 |

MURRAY TILLMAN, Primary Examiner

C. J. SECCURO, Assistant Examiner

U.S. Cl. X.R.

260—31.8 R, 31.8 M, 31.8 PO, 889